United States Patent [19]

Darm

[11] 4,365,480
[45] Dec. 28, 1982

[54] PROCESS GAS TREATING APPARATUS

[75] Inventor: William J. Darm, Tigard, Oreg.

[73] Assignee: United Air Specialists, Inc., Cincinnati, Ohio

[21] Appl. No.: 177,228

[22] Filed: Aug. 11, 1980

Related U.S. Application Data

[63] Continuation-in-part of Ser. No. 152,887, Jun. 3, 1980, which is a continuation-in-part of Ser. No. 53,819, Jul. 2, 1979, which is a continuation-in-part of Ser. No. 939,334, Sep. 5, 1978, which is a continuation-in-part of Ser. No. 567,258, Apr. 11, 1975, Pat. No. 4,140,175.

[51] Int. Cl.³ .................. F25D 21/12; F25D 17/00
[52] U.S. Cl. .......................... 62/82; 62/177; 62/282; 62/278
[58] Field of Search .............. 62/177, 282, 82, 275, 62/276, 278, 277

[56] References Cited

U.S. PATENT DOCUMENTS

| | | | |
|---|---|---|---|
| 1,277,895 | 9/1918 | Foster . | |
| 1,822,383 | 9/1931 | Snyder . | |
| 2,169,054 | 8/1939 | Mojonnier | 257/187 |
| 2,476,184 | 6/1949 | Goddard | 62/2 |
| 2,525,868 | 10/1950 | Corhanidis | 62/282 X |
| 3,232,029 | 2/1966 | Evans, Jr. | 55/71 |
| 3,377,817 | 4/1968 | Petrineck | 62/140 |
| 3,467,580 | 9/1969 | Weisarg et al. | 203/14 |
| 3,572,052 | 3/1971 | Toth | 62/278 |
| 3,732,703 | 5/1973 | Nordstrom et al. | 62/324 |
| 3,777,505 | 12/1973 | Otaki | 62/81 |
| 3,798,787 | 3/1974 | Heen | 34/75 |
| 3,827,343 | 8/1974 | Darm | 98/115 |

FOREIGN PATENT DOCUMENTS

| | | | |
|---|---|---|---|
| 2721521 | 11/1978 | Fed. Rep. of Germany | 62/82 |
| 53-37309 | 10/1978 | Japan . | |
| 711067 | 6/1954 | United Kingdom . | |

Primary Examiner—Albert J. Makay
Assistant Examiner—Harry Tanner
Attorney, Agent, or Firm—Frost & Jacobs

[57] ABSTRACT

An apparatus for condensing water vapor and vaporized solvent from process exhaust gas, such as from an industrial solvent drying oven process is described. The apparatus includes two parallel condenser assemblies which are alternately shifted between condensing and defrost modes. One of the assemblies is shifted into the condensing mode while the other is in the defrost mode and the other is shifted into the condensing mode while the one is in the defrost mode. When in the condensing mode, water vapor is condensed from the process exhaust gas in a water condenser such as a counterflow heat exchanger and solvent vapor is condensed therefrom by a solvent condenser such as a refrigeration coil positioned within a cold zone of the assembly. When in the defrost mode, a recirculating defrost loop is provided through which gas is circulated and heated for defrost purposes. Following defrosting, the defrosted condenser assembly is pre-cooled prior to shifting from the defrost mode back to the condensing mode. Valves are provided for shifting the condensing assemblies between the condensing and defrost modes and are positioned outside of the cold zone to minimize the effect of cold temperature on them.

15 Claims, 2 Drawing Figures

PROCESS GAS TREATING APPARATUS

BACKGROUND OF THE INVENTION

This application is a continuation-in-part of my earlier filed pending U.S. patent application Ser. No. 152,887, filed June 3, 1980, entitled OXYGEN REDUCTION SYSTEM AND CONDENSER APPARATUS WITH AUTOMATIC DEFROST, which is a continuation-in-part of my earlier filed pending U.S. patent application Ser. No. 053,819, filed July 2, 1979, entitled CONDENSER APPARATUS WITH AUTOMATIC DEFROST, which is a continuation-in-part of my earlier filed pending U.S. patent application Ser. No. 939,334, filed Sept. 5, 1978, entitled TWO-STAGE GAS CONDENSER WITH FEEDBACK COOLING, which is a continuation-in-part of my still earlier filed U.S. patent application Ser. No. 567,258, filed Apr. 11, 1975, entitled VERTICAL COUNTERFLOW HEAT EXCHANGER APPARATUS, which issued into U.S. Pat. No. 4,140,175 on Feb. 20, 1979.

1. Field of the Invention

The present invention relates generally to gas treating apparatus for condensing water vapor and solvent vapor from process exhaust gas, and particularly from process exhaust gas discharged from industrial dryer applications.

2. Description of Prior Art

Air pollution regulations promulgated by the Environmental Protection Agent of the U.S. Government require that the amounts of contaminants introduced into the atmosphere from certain manufacturing operations be below specified levels. For example, industrial dryers or process ovens utilized in connection with certain coating processes, such as assembly line automobile painting, magnetic tape manufacture, fabric coating, certain printing processes (flexographic and rotogravure) and drying of automobile vinyl, typically involve the vaporization of certain organic solvents such as kerosene, acetone, toluene, methyl ethyl ketone, and alcohols. In many instances exhaust gas from such equipment must be processed to reduce its concentration of solvents before the gas can be vented into the atmosphere or recirculated in the industrial dryer process. In addition, the ever increasing cost of such chemical solvents has made it highly desirable to condense them from the process exhaust gas for reusage.

Presently three basic methods are commonly utilized to deal with vaporized organic solvents. A first method involves heating the solvent laden exhaust gas to approximately 1400° F. in order to burn away the solvents. In addition to destroying the solvents, this approach consumes a large amount of fuel to heat the total body of air being treated to 1400° F. Large amounts of carbon dioxide, nitrogen and an appreciable amount of water are liberated. A second method involves passing the exhaust gas across a series of refrigerant cooling coils to eventually condense the vapor. This method requires substantial amounts of energy to operate the cooling coils. A third method utilizes charcoal bed filtration. The exhaust gas is passed through large flat beds of activated charcoal. Dual beds are used with one being reactivated with live steam and drained while the other is collecting solvent and water. The relatively expensive activated charcoal must be periodically replaced.

Previously, it has been known to use counterflow type heat exchangers as condensers. However, the cooling fluid has been a gas or liquid separate from the gas being cooled, as shown in U.S. Pat. No. 3,827,343 and U.S. Pat. No. 2,169,054. U.S. Pat. No. 3,232,029 discloses a condenser apparatus having a pair of heat exchanger stages for condensing a vaporized organic solvent out of an incoming gas in the first stage, the remaining gas being heated in the second stage. Condensed solvent is collected and drained off from the first heat exchanger stage through an outlet. The gas flowing through the heat exchanger stages comes into contact with coils through which a refrigerated coolant flows countercurrent to the flow of the gas. Due to the heat transferred during the condensation of the vaporized solvent, the coolant entering the coils of the second heat exchanger stage is at a higher temperature than the gas passing through the second stage. Thus, the second heat exchanger stage heats rather than cools the gas passing therethrough. In none of these patents is the cooling fluid provided by feeding back the gas being treated after condensation of water vapor or solvent from such gas.

British patent specification No. 711,067 shows a condenser system employing two heat exchanger stages for cooling. However, the second stage is employed for cooling the cooling liquid used in the first stage. In addition, the cooling liquid is separate from the treated gas which is condensed in the first stage.

Condenser apparatus often collect frost from the small volume water fraction normally found in the process exhaust gas being treated. This frost buildup tends to obstruct the flow of gas through the heat exchangers and results in a lowering of heat exchange efficiency. This in turn reduces solvent recovery efficiency in condenser apparatuses designed to handle solvent laden exhaust gas. Furthermore, this frost buildup and icing frequently hampers the operation of many mechanical parts within such devices.

In addition, U.S. Pat. No. 3,798,787 of Heen is understood to show a condenser system operating in a nitrogen charged paint dryer environment which employs, in succession, first cooling coils, a cross flow heat exchanger, second cooling coils and perforate plates surrounded by third cooling coils. The second and third coils are in a common chamber. Also, Heen states that the second coils include alternately operating halves with one half being de-iced while the other is condensing and vice versa. Additionally, cooled gas from the chamber is fed back through the heat exchanger for cooling purposes. However, Heen differs from the present invention for any one of a number of reasons. For example, because water is not condensed in the upstream heat exchanger, heavy icing will apparently occur at the second set of coils making the system inefficient. Also, separation of water vapor and solvent condensed in the chamber of Heen will be difficult because the second coils apparently will condense both water and significant amounts of solvent together. Also, in Heen, efficient heat transfer within the heat exchanger is impaired because the first cooling coils pre-cool the gas prior to its entry into the heat exchanger and exposure therein in heat transfer relationship to cooled gas from the chamber.

Therefore, a need exists for a more efficient solvent condenser apparatus.

SUMMARY OF THE INVENTION

In accordance with the present invention, a process exhaust gas treatment apparatus is provided having a plurality of condenser assemblies each with water vapor condenser means and solvent condenser means in which water vapor and other contaminants such as organic solvent are respectively condensed from the process exhaust gas. The condenser apparatus includes an automatic defrost control for alternately shifting each condenser assembly between a condensing mode in which process exhaust gas is routed to the assembly and a defrost mode in which the flow of process exhaust gas to the assembly is blocked. In a specific embodiment of the invention, when in the defrost mode, a defrost gas loop is established through which warm gas is circulated to defrost the assembly and thereafter the assembly is pre-cooled prior to shifting back to the condensing mode. The condensing assemblies are controlled so that one is in the defrost mode while the other is in the condensing mode and vice versa. As a more specific aspect of the invention, the automatic defrost control includes valve means positioned outside of a cold zone containing the solvent condenser means to virtually eliminate frost buildup on the valve means.

The objects and advantages of the present invention are to provide one or more of the following:

a process gas treatment apparatus for more efficiently recovering vaporized contaminants such as organic solvents from process exhaust gas;

a process gas treatment apparatus having means for condensing water from process exhaust gas at one location and means for condensing solvent from the process exhaust gas at a second downstream location;

a condenser apparatus of the aforementioned type having counterflow or other type heat exchanger means for condensing water vapor and feedback means for utilizing the process exhaust gas as the cooling fluid for the heat exchanger means after water and solvent have been condensed therefrom;

a condenser apparatus of the aforementioned type having at least two condenser assemblies, each including water vapor condensing means and solvent vapor condensing means, the assemblies being coupled in parallel configuration and including an automatic defrost control means for alternately directing the process exhaust gas through one of the condenser assemblies when it is in a condensing mode while the other one is in a defrost mode being defrosted;

a condenser apparatus of the foregoing type in which a defrost loop is established in each assembly when in the defrost mode, warm gas being circulated through the loop for defrosting the assembly;

a condenser apparatus of the foregoing type in which following defrosting of a condenser assembly it is cooled prior to shifting to a condensing mode;

a condenser apparatus of the foregoing type in which the number of moving mechanical parts within a cold zone containing the solvent condenser means is minimized;

a condenser apparatus of the foregoing type in which each condenser assembly includes a blower in the defrost loop for circulating gas for defrosting and pre-cooling purposes when the condenser assembly is in the defrost mode and for moving process exhaust gas through the assembly when in the condensing mode;

a condenser apparatus which uses feedback cooling to reduce the fuel requirements of the apparatus; and a condenser apparatus which is relatively compact, durable and reliable in operation.

BRIEF DESCRIPTION OF THE DRAWINGS

Other objects and advantages of the present invention will be apparent from the following detailed description of the preferred embodiment thereof and from the attached drawings, of which.

DETAILED DESCRIPTION OF PREFERRED EMBODIMENT

Figure 1:
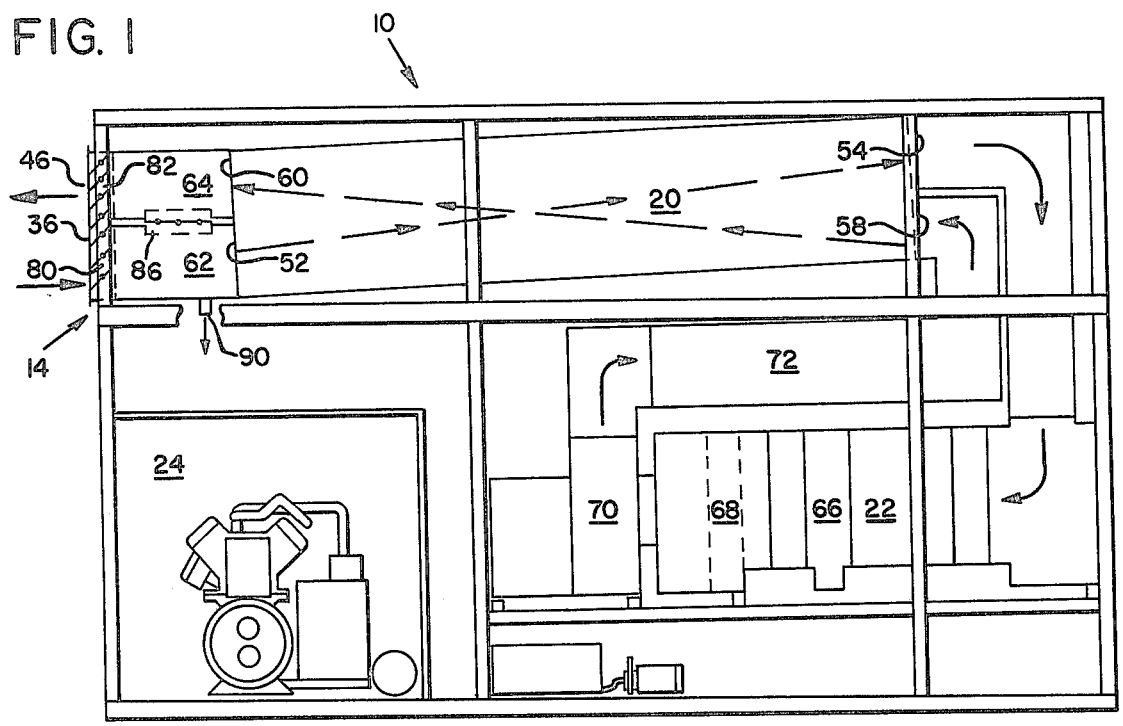
FIG. 1 is a side elevation view partially in section of one embodiment of the condenser apparatus of the present invention.
Figure 2:
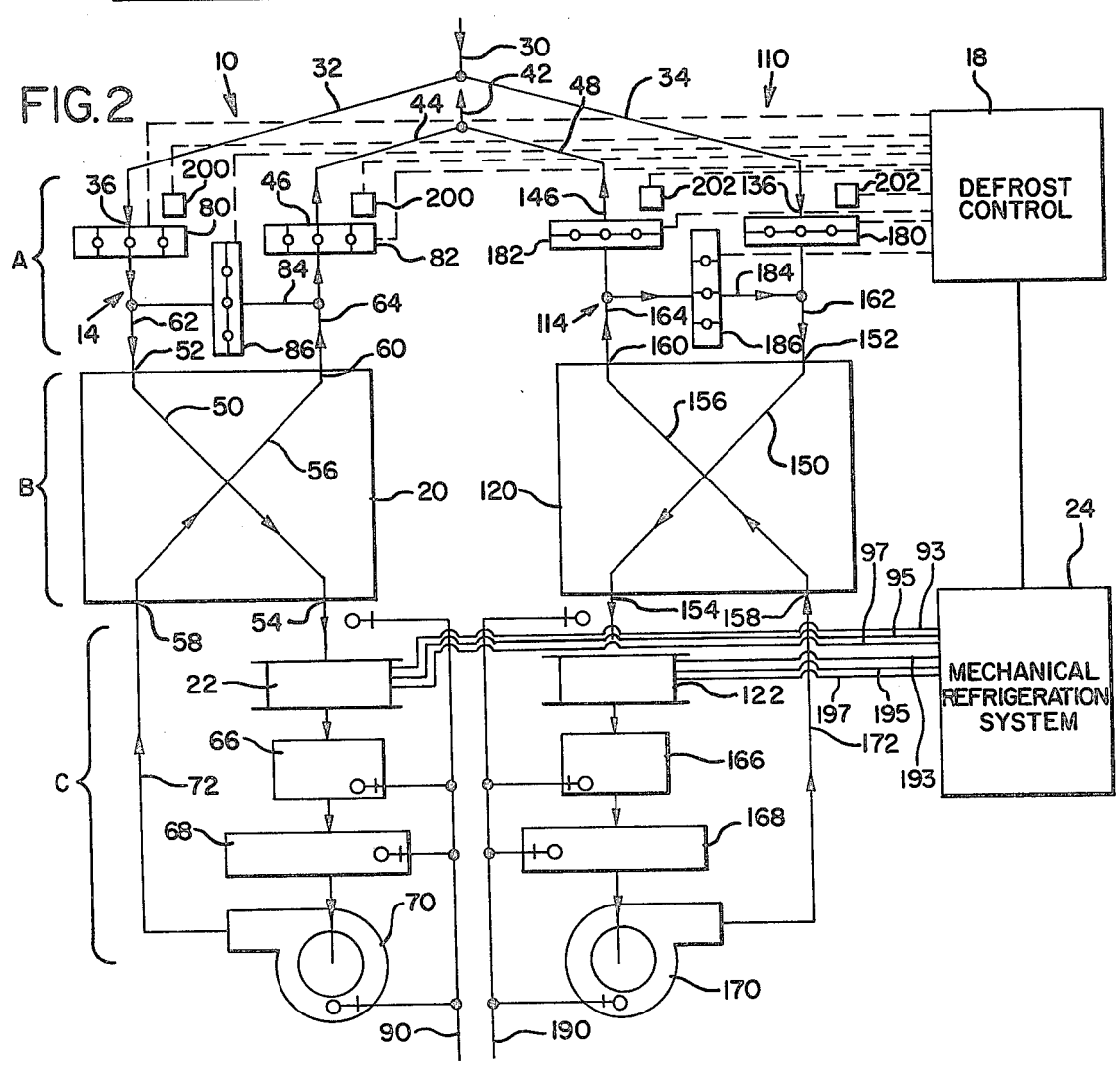
FIG. 2 is a schematic diagram of the condenser apparatus of FIG. 1.

With reference to FIGS. 1 and 2, a process exhaust gas treating apparatus in accordance with the invention has first and second condenser assemblies indicated generally at 10, 110. These assemblies treat industrial process exhaust gas, such as from a solvent drying oven by removing water vapor and vaporized solvent from the gas. As a specific example, this process exhaust gas may contain methyl ethyl ketone vapor along with water vapor and is treated by the assemblies to first remove substantially all of its water vapor and then to remove solvent vapor. The resulting substantially contaminant-free gas may, for example, then be returned to the industrial dryer or vented.

More specifically, condenser assemblies 10, 110 are, as explained below, connected in parallel and preferably operate alternately so that one is being defrosted while the other is treating process exhaust gas delivered to it and vice versa.

Each of the assemblies 10, 110 are substantially identical and, for convenience, corresponding components are indicated by numbers which are one hundred apart. Each condenser assembly 10, 110 includes flow control or shifting means having respective valve means 14, 114 controlled in response to signals from a defrost control means 18 which causes each condenser assembly to shift from a condensing operation or mode in which process gas is fed through it and treated and a defrost operation or mode in which the condenser assembly is defrosted. Also, the condenser assemblies each include a water vapor condensing means such as counterflow heat exchangers 20, 120 which are operated at temperatures suitable to condense substantially all of the water vapor in the process exhaust gas when the condenser assembly is in the condensing mode. In addition, each assembly 10, 110 includes a solvent condenser means such as respective refrigeration coils 22, 122 operable at temperatures cold enough to condense solvent vapor from the process exhaust gas after the water vapor has been removed by upstream water vapor condenser. That is, a mechanical refrigeration system 24, explained in more detail below, cooperates with defrost control 18 so that coils 22, 122 are cooled to condense solvent vapor when their associated condenser assemblies 10, 110 are in a condensing mode. In addition, coils 22, 122 are each heated when their respective condenser assemblies are in the defrost mode for defrosting purposes and thereafter cooled to pre-cool the assemblies prior to shifting from the defrost to condensing modes.

In greater detail, process exhaust gas obtained from an industrial operation such as a solvent drying oven is delivered along a line 30 to a Y-coupling section having one leg 32 connected to an inlet 36 of condenser assembly 10 and its other leg 34 connected to an inlet 136 of condenser assembly 110. Also, treated process exhaust gas is returned to the oven along a return line 42 connected by one leg 44 of a Y-coupling section to an outlet 46 of condenser assembly 10 and by another leg 48 of the coupling section to an outlet 146 of condenser assembly 110. Hence, condenser assemblies 10, 110 are connected in parallel.

Because the condenser assemblies 10, 110 are preferably identical, only condenser assembly 10 will be described in detail. As previously mentioned, heat exchanger 20 is provided for condensing substantially all of the water vapor from the process exhaust gas delivered to it. Although shown as a counterflow heat exchanger, other types of water vapor condensers are also suitable. For example, counterflow heat exchangers, cross flow heat exchangers, parallel heat exchangers, heat pipe exchangers, and heat wheels may be suitable. Heat exchanger 20 has a first set of forward flow or condensing passages 50 with an inlet 52 and an outlet 54 through which process exhaust gas flows and in which water vapor is condensed when condenser assembly 10 is in its condensing mode. In addition, this heat exchanger has a second set of discharge fluid passages 56 with an inlet 58 and an outlet 60 for the flow of cooling fluid in counterflow heat exchange relationship with passages 50. Such counterflow heat exchangers may be of the type shown in U.S. Pat. No. 3,912,004. As shown in FIG. 1, heat exchanger 20 (as well as heat exchanger 120) is generally horizontal, but tilted so that its coldest region is elevated relative to its warmest region. That is, the end of heat exchanger 20 containing inlet 58 and outlet 54 is elevated relative to the end of the heat exchanger containing inlet 52 and outlet 60. Consequently, as process exhaust gas enters inlet 52 and begins to condense, water flows toward and is drained by a drain 90 of the heat exchanger. In typical applications, only the coldest region of heat exchanger 20, adjacent outlet 54, is subfreezing so that ice formation is confined to this region of the heat exchanger alone. Thus, because of the tilt of the heat exchanger, the bulk of the water condensed in the heat exchanger drains toward the warm region and drain 90 and not toward the subfreezing region where it would form ice. Hence, the efficiency of the apparatus is improved.

A gas supply passageway 62 establishes a process exhaust gas supply flow path from condenser assembly inlet 36 to the heat exchanger inlet 52 and thus to forward flow passages 50 of the heat exchanger. Another passageway 64 establishes a gas flow path from discharge passages 56 through heat exchanger outlet 60 and to the outlet 46 of the condenser assembly.

Refrigeration coil 22 is positioned downstream of heat exchanger 20 and connected to its outlet 54 so that process exhaust gas flows to coil 22 after removal of water vapor. Process exhaust gas is then cooled by coil 22 so that a major portion of the solvent vapor is condensed from it. Treated process exhaust gas is discharged from coil 22 through a drain section 66 in which condensed solvent is collected. Gas passes from drain section 66 through a de-mister section 68, a blower 70 and passageway 72 to inlet 58 of the heat exchanger discharge fluid passages 56. Thus, a discharge flow path is defined in this case through interconnected drain section 66, de-mister 68, blower 70, passageway 72, heat exchanger discharge fluid passages 56, passageway 64, leg 44 and return line 42 to the process oven.

Drain section 66 is located downstream of coil 22 so that it collects the majority of solvent condensed by the coil when the condenser assembly is in the condensing mode. De-mister section 68, which may comprise a dense wire mesh, captures solvent droplets suspended in the treated process exhaust gas passing through it. In addition, blower 70, by centrifugal action, also collects a certain amount of solvent and this collection is aided by positioning the blower in the coldest zone of the condenser. Incidentally, blower 70 is preferably of the AMCA, Type A, explosion proof construction classification and functions to circulate gas through the condenser assembly.

Condenser assembly 10 also includes a valve means 14 for shifting the condenser assembly between a condensing mode in which it receives and treats process exhaust gas and a defrost mode in which the supply of process exhaust gas is interrupted, it is defrosted and then pre-cooled. In the illustrated embodiment, valve means 14 includes process exhaust gas flow control valve means comprising a first valve or damper 80 positioned at a first location upstream of gas supply passageway 62 and a second valve or damper 82 positioned downstream of the discharge passageway 64. In addition, a defrost passageway 84 is established which communicates between gas supply passageway 62 downstream of damper 80 and discharge passageway 64 upstream of damper 82. Valve means 14 also includes a defrost valve or damper 86 which controls the flow of gas through defrost passageway 84.

When condenser assembly 10 is in the condensing mode as shown in FIG. 2, defrost control 18 actuates dampers 80, 82 into open positions so that process exhaust gas flows through damper 80 and into heat exchanger 20. At the same time, damper 86 is activated by defrost control 18 to a closed position. As it flows through heat exchanger 20, the process exhaust gas loses a major portion of its water vapor because it is cooled by cooling gas flowing in the opposite direction through discharge fluid passages 56 of the heat exchanger in the opposite direction. As a specific example, the process exhaust gas may be cooled to 0° F. so that virtually all of the water vapor is removed. Of course, some of this water vapor will freeze within heat exchanger 20, but this does not interfere with the operation of the apparatus as this frost is removed when the assembly is shifted to its defrost mode. That is, as explained below, the heat exchanger 20 is defrosted along with all of the other internal surfaces of the condenser assembly when in the defrost mode. Consequently, subfreezing temperatures can be maintained in the heat exchanger to cause condensation of a greater amount of water vapor than if above freezing temperatures were maintained therein, as any frost buildup is eliminated when the assembly is defrosted. Also, very little solvent is condensed within heat exchanger 20 as significant methyl ethyl ketone condensation occurs at temperatures below 0° F. Of course, these temperatures may be adjusted for varying solvent condensation application. Also, it should be noted that for those solvents with condensing temperatures in the same range as that of water, solvent and water will condense together in heat exchanger 20 and in other parts of the apparatus. This mixture of water and solvent can then be separated by decanting, distillation, or other means.

From heat exchanger 20, the process exhaust gas flows through coil 22 which cools it sufficiently to remove a major portion of the vaporized solvent. As shown schematically in FIG. 2, coil 22 is provided with refrigerant lines 93 which supply refrigerant to the coil for cooling purposes when condensing assembly 10 is in its condensing mode. Also, coil 22 is provided with hot gas lines 95 which supply hot refrigerant gas from compressor discharge to the coil for defrosting purposes when the assembly is in its defrost mode. In addition, coil 22 is provided with pre-cooling means such as pre-cooling refrigerant supply lines 97 which supply refrigerant to the coil after defrosting and prior to the shift of assembly 10 from its defrosting to condensing modes. Coil 22 is operated to cool the process exhaust gas to, for example, −50° F., to cause removal of the bulk of the solvent which is then collected in drain section 66. Drain means 90 then carries away the condensed liquid. Drain 90 may, of course, comprise separate drain lines to various sections of the condenser assembly so that water and solvent are separately collected. Thus, one such line may be connected to heat exchanger 20 for draining water while another such line may drain solvent from the remaining downstream sections of the condenser assembly.

While condenser assembly 10 is in its condensing mode as previously described in which water vapor and solvent vapor are condensed from the process exhaust gas, condenser assembly 110 is in its defrost mode. When in the defrost mode, as shown in FIG. 2, valves 180, 182 are closed and prevent the ingress and egress of process exhaust gas to and from condenser assembly 110. In addition, damper 186 is open so that a recirculating defrost gas flow loop is established in the condenser assembly 110. This defrost gas flow loop comprises defrost passageway 184, gas supply flow path 162 downstream of passageway damper 180, water vapor condensing means comprising forward flow passages 150, coil 122, and the discharge flow path which includes drain section 166, de-mister 168, blower 170, passageway 172, heat exchanger discharge flow passages 156 and passageway 164.

When condenser 110 is shifted to its defrost mode, the mechanical refrigeration system 38 transmits hot refrigerant gas from a compressor discharge line along hot gas lines 195 to coil 122 and heats the coil. Meanwhile, blower 170 circulates gas contained within the defrost flow loop through the loop so that the recirculating gas is heated by coil 122. This recirculating heated gas defrosts all of the interior surfaces of the condenser assembly 110 in a very short time, typically on the order of fifteen minutes. Following defrosting and while still in the defrost mode, mechanical refrigeration system 24 supplies refrigerant along pre-cooling refrigerant supply lines 197 to coil 122 causing it to cool and lower the temperature of gas circulating in the defrost flow loop. Thus, the temperature of surfaces within the condenser assembly 110 are lowered prior to its shifting from the defrost mode to the condensing mode. As a result, condenser assembly 110 is ready to being treating process exhaust gas upon frost buildup in condenser assembly 10, at which time condenser assembly 110 is shifted to its condensing mode and condenser assembly 10 is shifted to its defrost mode.

Over a substantial period of time, for example, two hours, frost gradually builds up within condenser assembly 10 as it condenses water and solvent vapors from the process exhaust gas. Frost formation is detrimental to the system airflow as well as to solvent recovery efficiency. Consequently, the present invention includes automatic defrost means for alternately directing the process exhaust gas from condenser assembly 10 to condenser assembly 110 upon detection of a predetermined amount of frost in condenser assembly 10.

Sensing means are provided for independently detecting the presence of a predetermined amount of frost in the condenser assemblies. This sensing means preferably includes two pairs of sensors 200, 202, one pair of each of the two assemblies 10, 110. These sensors monitor the differential gas pressure or differential gas temperature, or a combination of both, between inlet 36 and outlet 46 of condenser assembly 10 and corresponding inlet 136 and outlet 146 of condenser assembly 110. In addition, these sensors transmit electrical output signals corresponding to the pressure and/or temperature detected to a differential amplifier in the defrost control device 18. This control device includes a voltage comparator which compares the differential amplifier output with the reference voltage corresponding to a predetermined maximum pressure difference or temperature difference caused by a predetermined amount of frost in the condenser assembly. This control actuates dampers 80, 82, 86, 180, 182 and 186 to shift the condenser assemblies between condensing and defrost modes when the output of the differential amplifier exceeds a reference voltage. Of course, other sensing means are also suitable.

Thus, upon detecting a predetermined frost buildup in the condenser assembly which is in the condensing mode, the defrost control shifts the dampers of such assembly causing it to shift to the defrost mode. In addition, the respective dampers of the other condenser assembly are shifted from their defrost mode to their condensing mode. Thus, the condensing to defrost mode cycle of the condenser assemblies continues uninterrupted.

The defrost control 18 may include a timing mechanism so that at the conclusion of a specific time interval condenser assemblies 10, 110 are shifted between their respective defrost and condenser modes. Alternately, the defrost control can be designed so that after defrosting of one of the condenser assemblies and after the defrosted condenser assembly is pre-cooled, the defrosted and pre-cooled condenser assembly remains in its defrost mode until such time as a predetermined amount of frost is detected in the other condenser assembly at which time switching occurs.

Valve means 14 are preferably located in a relatively high temperature valve control zone A. Temperatures in this zone are above freezing. As a result, the valves do not become iced which would impair or stop their operation entirely. Also, passageways 62, 64 are preferably adjacent to one another and separated by a common plate through which defrost passageway 84 is defined. Consequently, heat from process exhaust gas entering passageway 62 warms process exhaust gas leaving passageway 64 thereby reducing the energy requirements of the apparatus.

In addition, heat exchanger 20 is located in a water condensation zone B which, when condenser assembly 10 is in its condensing mode is at a lower temperature than found in valve control zone A. Furthermore, coil 22 is located in the coldest zone of the apparatus, zone C. Because of the extremely low temperatures typically found at the low temperature coil 22 during condensation of solvent, any water vapor remaining in the process exhaust gas at this point tends to freeze and form ice. Although such ice formation does not significantly affect the blower 70, because it continuously operates, it does tend to impair the operation of other components, such as valves, with mechanically moving components. Consequently, the apparatus is designed so that the only mechanical moving components positioned within cold zone C are those associated with the blower, which are insensitive to icing. In addition, valve means 14 are positioned in valve control zone A where they are shielded from the cold zone C by the intermediate heat exchanger containing zone B. Hence, the icing of the valve means 14 is eliminated.

Referring to FIG. 1, refrigeration system 24 may be maintained in a pressurized compartment supplied with non-combustible gas. This prevents seepage of potentially explosive combustions of solvent vapor and oxygen into the compartment.

Having illustrated and described the principles of my invention with reference to one preferred embodiment, it should be apparent to those skilled in the art that such invention may be modified in arrangement and detail without departing from such principles. For example, when condenser assemblies are in their defrost mode, valves 82, 182 can be opened and defrosting will still be accomplished. Also, although a hot refrigerant gas defrost system has been described for defrosting a condenser assembly in its defrost mode, the apparatus is not limited to this arrangement. For example, electric heaters, hot brine or other means may be employed for defrosting purposes. Also, cool brine or alternate means may be utilized to cause water and solvent vapor condensation. I claim as my invention all such modifications which come within the true spirit and scope of the following claims.

I claim:

1. A process exhaust gas treating apparatus for condensing water vapor and vaporized solvent from the process exhaust gas comprising:

at least two condenser assemblies connected in parallel, each of said assemblies including means defining a gas flow path having an upstream inlet and a downstream outlet, water vapor condenser means in said gas flow path, solvent vapor condenser means in said gas flow path downstream of said water vapor condenser means, means defining a defrost gas flow passageway which communicates between a first location in said gas flow path upstream of said water vapor condenser means and a second location in said gas flow path downstream of said solvent vapor condenser means, and defrost control means for selectively shifting each condenser assembly between a condensing mode and a defrost mode so that when the condenser assembly is in the condensing mode the inlet and outlet of the gas flow path are open to permit the flow of process exhaust gas through the gas flow path, the water vapor condenser means condenses water vapor to a liquid from process exhaust gas flowing in the gas flow path, and said defrost gas flow passageway is closed, and so that when the condenser assembly is in the defrost mode said inlet is closed and prevents the passage of process exhaust gas therethrough and said defrost gas flow passageway is open to provide a recirculating defrost gas flow loop which includes the defrost gas flow passageway and that portion of the gas flow path from the first location downstream to the second location, said defrost control means comprising means for shifting one of said assemblies into said condensing mode while another of said assemblies is in the defrost mode and for shifting said one of said assemblies into said defrost mode while another of said assemblies is in the condensing mode, and means for removing said condensed water and solvent from said water and solvent condensing means, respectively.

2. A process exhaust gas treating apparatus according to claim 1 in which said solvent vapor condenser means is positioned within a cold zone of said condenser assembly and in which said defrost control means includes valve means positioned outside of said cold zone so as to be separated from cold temperatures within the cold zone when the condenser assembly is in the condensing mode.

3. A process exhaust gas treating apparatus according to claim 1 in which each said condenser assembly includes means for recirculating gas contained within the defrost gas flow loop through the loop when said condenser assembly is in the defrost mode and means for heating the recirculating gas to defrost the condenser assembly.

4. A process exhaust gas treating apparatus according to claim 3 in which each said condenser assembly includes pre-cooling means for cooling gas within the defrost gas flow loop prior to the shift of said condenser assembly from the defrost mode to the condensing mode.

5. A process exhaust gas treating apparatus for condensing water vapor and vaporized solvent from process exhaust gas comprising:

first and second condenser assemblies connected in parallel, each such assembly including a. water vapor condensing means for condensing as a liquid substantially all of the water vapor from process exhaust gas delivered thereto, b. means establishing a gas supply flow path for delivering process exhaust gas to said water vapor condensing means, c. solvent vapor condenser means coupled to said water vapor condenser means for receiving process exhaust gas after treatment by said water vapor condenser means and for condensing solvent vapor as a liquid from the received process exhaust gas, d. means establishing a discharge flow path for discharge of treated process exhaust gas from said solvent vapor condenser means, e. process gas flow control valve means for controlling the flow of process exhaust gas to the water vapor condenser means at a first location upstream of said gas supply flow path, said process gas flow control valve means also comprising means for controlling the flow of treated process exhaust gas from the discharge flow path at a second location downstream of said discharge flow path, f. means establishing a defrost passageway communicating between said gas supply path downstream of said first location and said discharge flow path upstream of said second location, g. defrost valve means for controlling the flow of gas through said defrost passageway, h. defrost control means for shifting said process exhaust gas valve means and said defrost valve means to a defrost position in which said gas supply and discharge flow paths are closed and said defrost passageway is open, said defrost control means also comprising means for shifting said process exhaust gas valve means and said defrost valve means to a condensing position in which said gas supply and discharge flow paths are closed and said defrost passageway is open, i. recirculating means for recirculating gas within a defrost gas flow loop comprising said defrost passageway, the gas supply flow path, the water vapor condenser means, the solvent vapor condenser means, and said discharge flow path when the process exhaust gas valve means and defrost valve means are in the defrost position, j. heating means for heating the recirculating gas for defrost purposes, said defrost control means of said first and second condenser assemblies being operable such that the process exhaust gas valve means and defrost valve means of the first assembly are in their condensing position when the process exhaust gas valve means and defrost valve means of the second assembly are in their defrost position, and such that the process exhaust gas valve means and defrost valve means of the second condenser assembly are in their condensing position when the process exhaust gas valve means and defrost valve means of the first condenser assembly are in their defrost position, and k. means for removing said condensed water and solvent from said water and solvent condensing means, respectively.

6. A process exhaust gas treating apparatus according to claim 5 in which each said condenser assembly includes means for cooling the recirculating gas for pre-cooling the defrost gas flow loop following defrosting and prior to shifting the process exhaust gas valve means and defrost valve means from their defrost position to their condensing position.

7. A process exhaust gas treating apparatus according to claim 6 in which each said solvent vapor condenser means comprises refrigeration coil means.

8. A process exhaust gas treating apparatus according to claim 5 in which said recirculating means of each condenser assembly comprises a gas blower means positioned in the associated discharge flow path.

9. A process exhaust gas treating apparatus according to claim 8 in which said solvent vapor condenser means and blower means of each condenser assembly are positioned in a cold zone of the assembly and in which said blower means is the only element with mechanically moving parts within the cold zone.

10. A process exhaust gas treating apparatus according to claim 8 in which each said condenser assembly includes a drain section and de-mister section, the de-mister section being positioned downstream of the drain section, said drain and de-mister sections being positioned in the associated discharge flow path between the associated solvent condenser means and blower means.

11. A process exhaust gas treating apparatus according to claim 5 in which the water vapor condenser means of each assembly comprises a heat exchanger means having at least one condenser passageway communicating between the associated gas supply flow path and solvent condenser means, said heat exchanger means also having at least one cooling flow passageway included within the discharge flow path, said condenser passageway and cooling passageway being in heat exchange relationship with one another.

12. A process exhaust gas treating apparatus according to claim 11 in which said heat exchanger means comprises a counterflow heat exchanger.

13. A process exhaust gas treating apparatus accordance to claim 11 in which each assembly includes a valve flow control zone, a water vapor condensing zone, and a cold solvent condensing zone separated from said valve flow control zone by said water vapor condensing zone, the water vapor condensing means of each assembly being positioned in the associated water vapor condensing zone, the solvent vapor condensing means of each assembly being positioned in the associated solvent condensing zone, and the process exhaust valve means and defrost valve means of each assembly being positioned in the associated valve flow control zone and outside of the cold solvent condensing zone.

14. A method of treating process exhaust gas containing water vapor and vaporized solvent comprising:

directing process exhaust gas through a first flow path of a condenser assembly to thereby place the condenser assembly into a condensing mode;

condensing water vapor to a liquid from process exhaust gas in the first flow path when the condenser assembly is in the condensing mode;

condensing solvent vapor to a liquid from process exhaust gas in the first flow path when the condenser assembly is in the condensing mode;

detecting frost buildup in the first flow path when the condenser assembly is in the condensing mode;

preventing the flow of process exhaust gas through the first flow path and establishing a defrost flow loop including a major portion of the first flow path upon detection of the predetermined level of frost buildup in the first flow path to thereby place the condenser assembly into a defrost mode;

recirculating gas through the defrost flow loop when the condenser assembly is in the defrost mode;

warming the gas recirculated through the defrost flow loop when the condenser assembly is in the defrost mode for defrosting purposes;

connecting at least two such condenser assemblies in parallel and alternately shifting each condenser assembly between a defrost mode and condensing mode such that at least one assembly is in its condensing mode while another is in a defrost mode and vice versa; and removing the condensed water and solvent.

15. A method according to claim 14 including the step of cooling the gas recirculating through the defrost flow loop following defrosting and when the condenser assembly is in the defrost mode so that the condenser assembly is pre-cooled.

* * * * *